United States Patent
Yonezawa

(10) Patent No.: US 7,248,541 B2
(45) Date of Patent: Jul. 24, 2007

(54) OPTICAL DISK DEVICE AND ACCESS METHOD FOR OPTICAL DISK DEVICE

(75) Inventor: Minoru Yonezawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 719 days.

(21) Appl. No.: 10/629,894

(22) Filed: Jul. 30, 2003

(65) Prior Publication Data

US 2004/0076084 A1 Apr. 22, 2004

(30) Foreign Application Priority Data

Jul. 30, 2002 (JP) ............................. 2002-221833

(51) Int. Cl.
*G11B 21/08* (2006.01)

(52) U.S. Cl. .................................. 369/30.12

(58) Field of Classification Search ................ None
See application file for complete search history.

(56) References Cited

U.S. PATENT DOCUMENTS

| | | | | |
|---|---|---|---|---|
| 5,121,370 A * | 6/1992 | Yanagi | ..................... | 369/30.15 |
| 5,471,441 A * | 11/1995 | Nonaka et al. | .......... | 369/30.11 |
| 5,696,743 A * | 12/1997 | Kawasaki | ................ | 369/30.13 |
| 5,808,982 A * | 9/1998 | Yun | ........................ | 369/30.13 |
| 5,920,527 A * | 7/1999 | Aoki | ....................... | 369/30.15 |
| 6,330,212 B1 * | 12/2001 | Iida | .......................... | 369/30.16 |
| 6,370,091 B1 * | 4/2002 | Kuroda | .................... | 369/30.08 |
| 6,606,283 B2 * | 8/2003 | Chan | ........................ | 369/30.15 |
| 6,704,252 B2 * | 3/2004 | Aso et al. | ................. | 369/30.11 |
| 6,801,494 B2 * | 10/2004 | Ross | ........................ | 369/275.3 |
| 6,834,028 B2 * | 12/2004 | Itoh et al. | ................ | 369/30.17 |
| 2004/0001410 A1 * | 1/2004 | Yonezawa | ................ | 369/53.24 |
| 2004/0076091 A1 * | 4/2004 | Yonezawa | ................ | 369/30.11 |

FOREIGN PATENT DOCUMENTS

| | | |
|---|---|---|
| JP | 06-176376 | 6/1994 |
| JP | 6-290469 | 10/1994 |
| JP | 10-134364 | 5/1998 |
| JP | 2000-048378 | 2/2000 |
| JP | 2000-207750 | 7/2000 |
| JP | 2000-251271 | 9/2000 |
| JP | 2000-331353 | 11/2000 |
| JP | 2001-1034961 | 2/2001 |
| JP | 2001-126270 | 5/2001 |

* cited by examiner

*Primary Examiner*—Tan Dinh
(74) *Attorney, Agent, or Firm*—Pillsbury Winthrop Shaw Pittman, LLP

(57) ABSTRACT

An optical disk device has a recording information management portion which detects a distribution of a recorded region R and an unrecorded region M based on reflection light received by an optical head and an access target setting circuit which determines an access target of an optical head so as to make access to a target position of a recording layer of an optical disk while avoiding the unrecorded region M based on the detected distribution of the regions. Since an access is made while passing through only the recorded region R, a servo operation can be stabilized.

5 Claims, 15 Drawing Sheets

OPTICAL DISK DEVICE AND ACCESS METHOD FOR OPTICAL DISK DEVICE

CROSS-REFERENCE TO RELATED APPLICATIONS

This application is based upon and claims the benefit of priority from the prior Japanese Patent Application No. 2002-221833, filed Jul. 30, 2002, the entire contents of which are incorporated herein by reference.

BACKGROUND OF THE INVENTION

1. Field of the Invention

The present invention relates to an optical disk device. More particularly, the present invention relates to an optical disk device and an access method for the optical disk device for making reliable access while avoiding an unrecorded region during optical-head access.

2. Description of the Related Art

Recently, an optical disk device such as DVD (Digital Versatile Disc) has been developed and widely known. In such an optical disk device or the like, there is a demand for high operational reliability, usability, or the like.

As an example of such an optical disk device, in an optical disk device described in Jpn. Pat. Appln. KOKAI Publication No. 2000-251271, the following technique is disclosed. In the case of an interlayer jump of a double-layered disk, if a target address position is at the inner periphery than a current address position, a seek operation is carried out up to a radial position of the same recording layer which corresponds to the target address position. Then, an interlayer jump is carried out and reaches the target address position. On the other hand, in the case where a target address position is at the outer periphery than a current address position, an interlayer jump is carried out at the current address position, and then, a seek operation is carried out for the target address position.

In other words, in a reproduction type optical disk, an optical disk having a plurality of layers has been developed and made popular. Similarly, there is proposed a recording type optical disk having a plurality of recording layers on one side from a demand for increasing the capacity of data to be recorded in an optical disk. In the case where the disk thus has a plurality of recording layers, a transmission rate of a shallower recording layer must be increased in order to maintain the reflection index of each recording layer to be substantially constant. As a result, the reflection index to be maintained constant is reduced, and an optical disk is produced so that the reflection index of each layer is substantially equal to this low reflection index. Thus, signal levels of a variety of signals are lowered, and an S/N ratio is degraded.

On the other hand, in a recording layer, the reflection indexes of an unrecorded region and a recorded region differ depending on disk characteristics. The disk characteristics include two characteristics, i.e., a characteristic in which the reflection index is reduced by data recording as in DVD-RAM or the like and a characteristic in which the reflection index is increased by such recording. In general, a change in this reflection index is greater than twice or half. In the boundary region between a recorded region R and an unrecorded region M, a variety of signals are affected by the change in this reflection index. In particular, in the case where precise servo is required, there is a possibility that such an effect of change results in a large disturbance.

Thus, as in the conventional reproduction type optical disk device, when an interlayer jump is carried out in order to make access to a specific target position on a storage region, if the center axes of the recording layers are not aligned in a double-layered disc, an interlayer jump destination may be the unrecorded region M. In such a case, there is a problem that the disk is affected by the boundary region or a signal level which depends on the region in an unstable state after a jump, and a servo state becomes unstable.

Further, in the case of a recording type optical disk, in order to record/reproduce information, it is required that a response time from a time when a recording/reproduction request occurs to a time when a recording/reproduction operation is started is fast. Since different adjustments are required depending on the recorded region R and the unrecorded region M, it is believed that an access method in which only the recorded region R requiring minimal adjustment is passed is stable. However, as in the conventional device, according to a rectangular access method for connecting a current address position to a target address position with the shortest distance, it is not guaranteed that a region in which an interlayer jump has been carried out with the shortest distance is always a recorded region. Thus, there is a problem that, when the unrecorded region M is passed, the servo state becomes unstable.

In addition, if focusing unintentionally occurs in the unrecorded region M due to runaway or track deviation which occurs during an access or due to focus deviation, the signal levels differ depending on the recorded region R and the unrecorded region M as described above. Thus, track pull-in action cannot be carried out, and an operation of restoring to the recorded region R cannot be carried out smoothly.

In other words, as described above, in the conventional optical disk device, when an access to the recording region of an optical head is instructed, there is a case in which the unrecorded region M whose reflection index or the like differs from that of the recorded region R is passed when an access to a target position is made with the shortest distance. Thus, there is a problem that the servo state becomes unstable.

BRIEF SUMMARY OF THE INVENTION

According to one embodiment of the present invention, there is provided an optical disk device, comprising an optical head which emits a laser light to an optical disk having a recording layer and receives a reflection light to carry out one of a recording process and reproduction process, a detecting unit which detects a distribution of a recorded region and an unrecorded region of the optical disk based on a reflection light received by the optical head, and a control unit which controls the optical head so as to make access to a target position of a recording layer of the optical disk while avoiding the unrecorded region based on a distribution of a recorded region and an unrecorded region detected by the detecting unit.

DETAILED DESCRIPTION OF THE INVENTION

Hereinafter, preferred embodiments of an optical disk device and an access method for the optical disk device according to the present invention will be described with reference to the accompanying drawings.

Optical Disk Device According to the Present Invention

Figure 1:
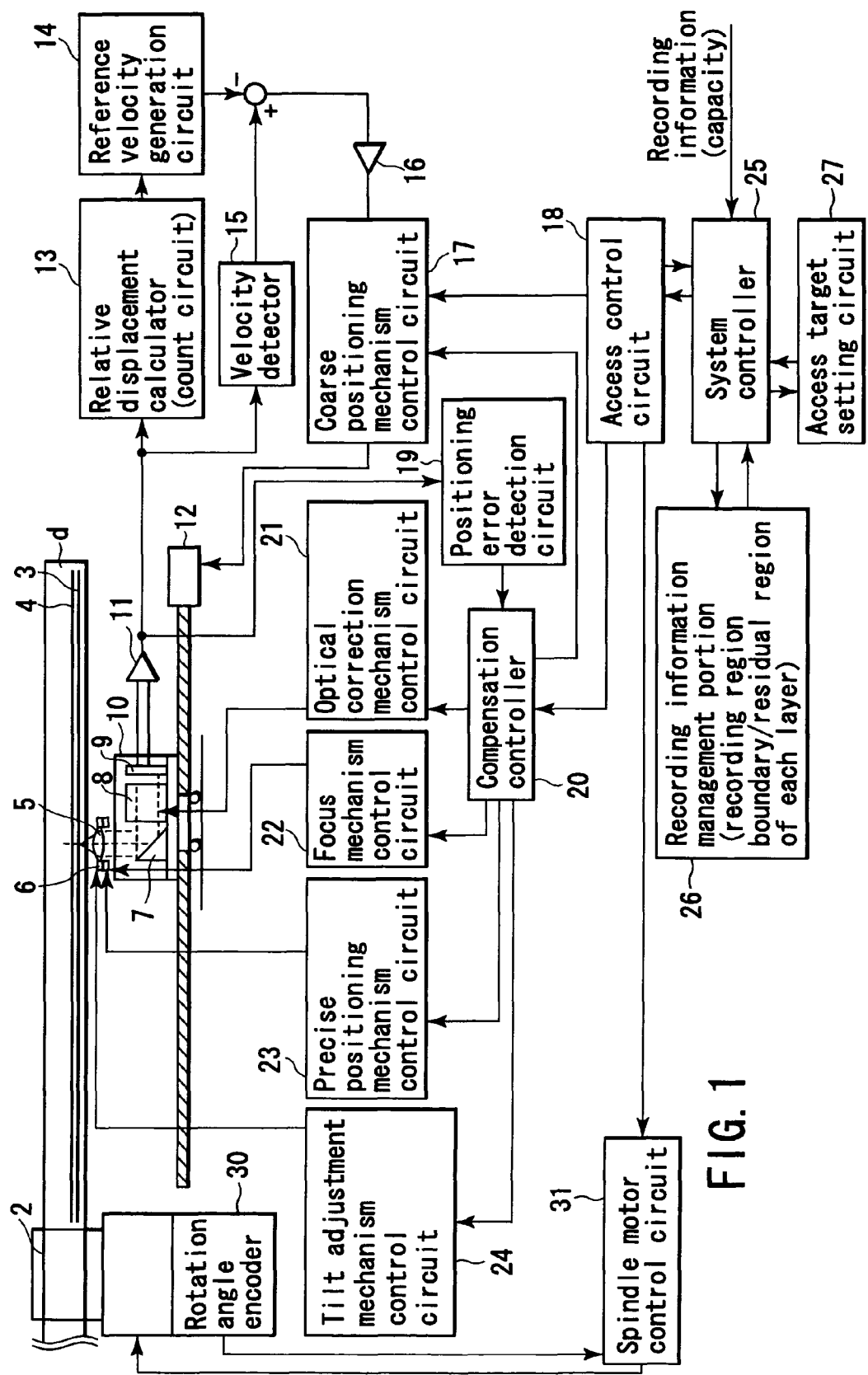
FIG. 1 is a block diagram showing an example of a configuration of an optical disk device according to a first embodiment of the present invention.
Figure 2:
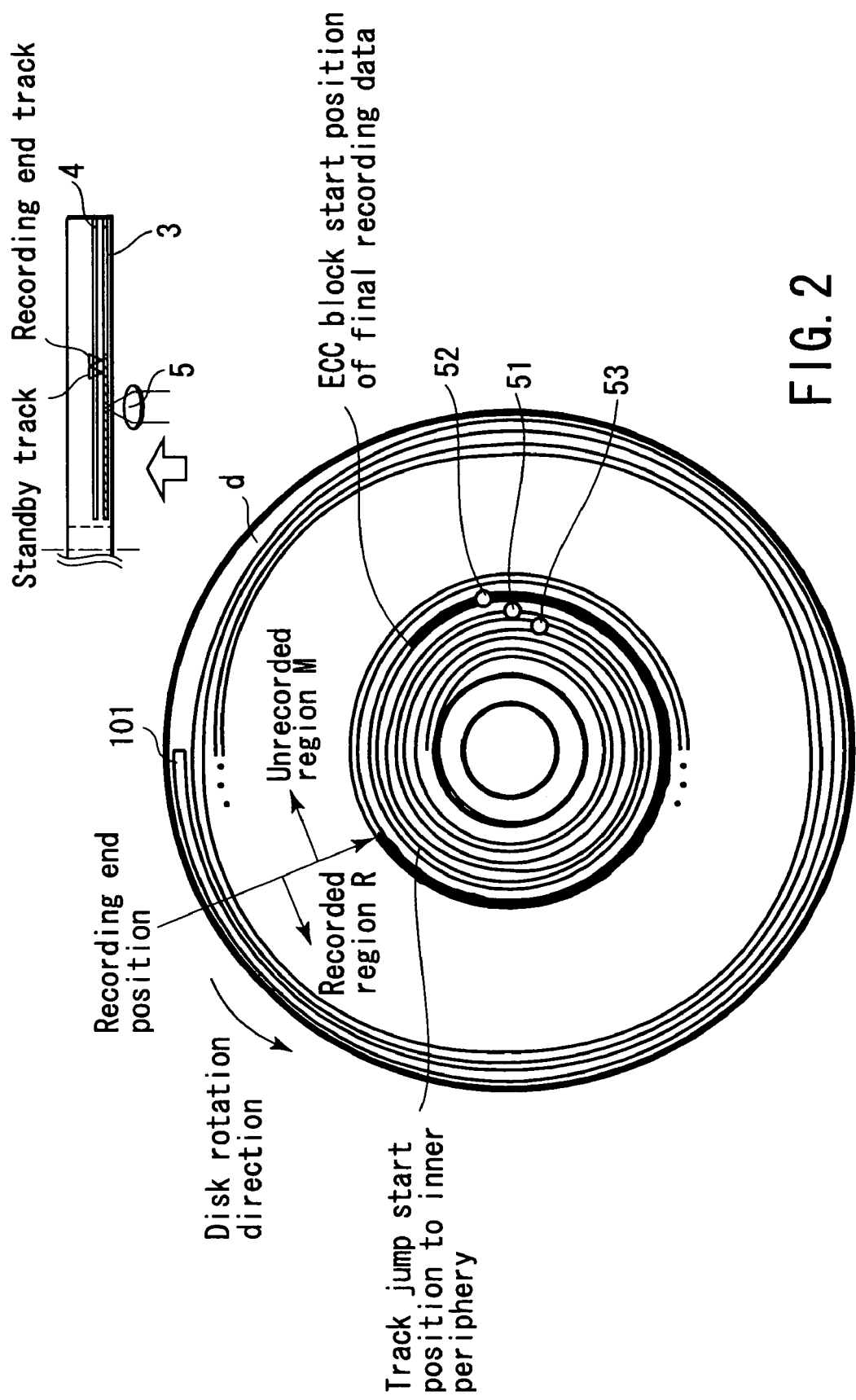
FIG. 2 is a view when an optical disk of the optical disk device according to the first embodiment of the present invention is seen from an incident face.
Figure 3:
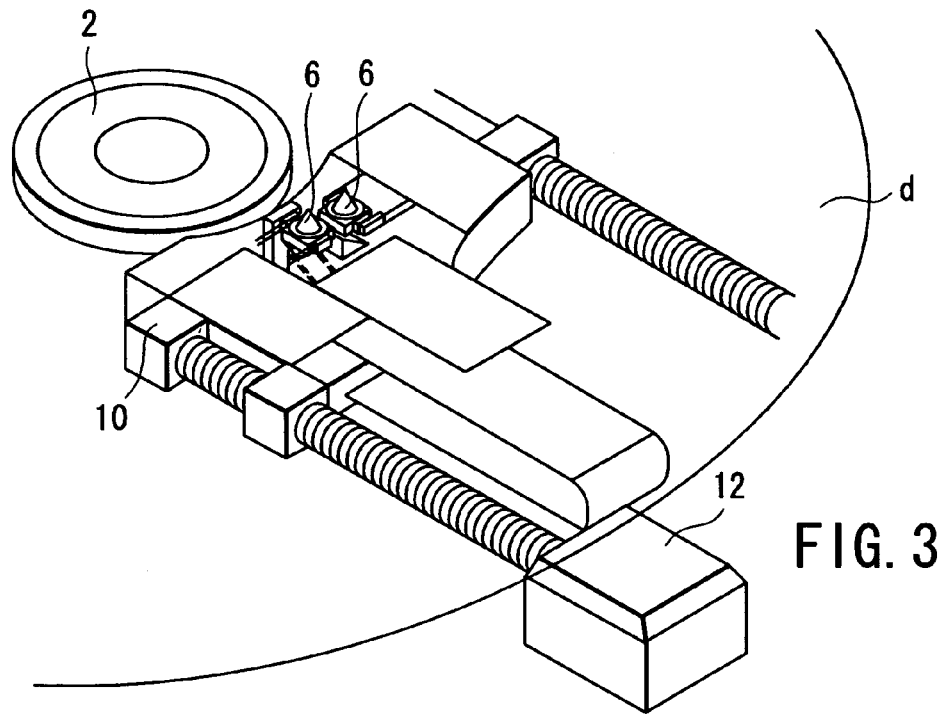
FIG. 3 is a perspective view showing a configuration around an optical head in the optical disk device according to the first embodiment of the present invention.
Figure 4:
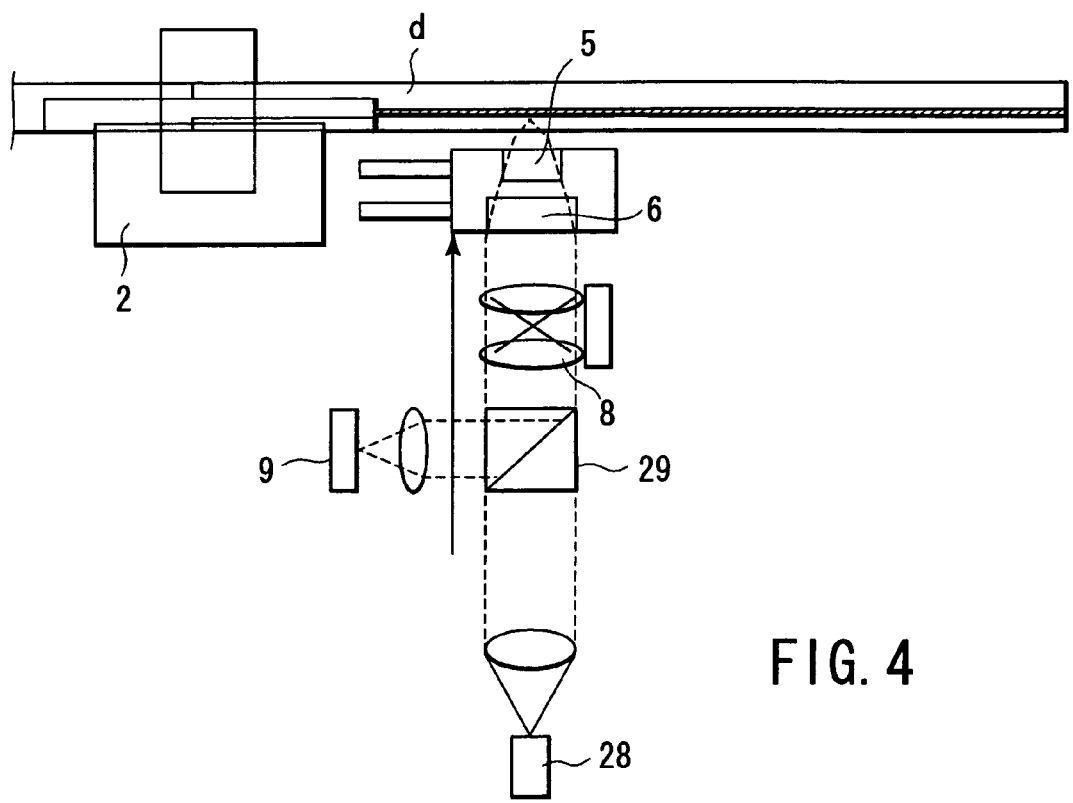
FIG. 4 is a configuration diagram of an optical system of the optical head in the optical disk device according to the first embodiment of the present invention.

A configuration of an optical disk device according to a first embodiment of the present invention will be described. FIG. 1 is a block diagram showing an example of the optical disk device according to the first embodiment of the present invention. FIG. 2 is a block diagram showing an example of an optical disk according to the first embodiment of the present invention. FIG. 3 is a configuration diagram showing an arrangement of an optical head and the like of the optical disk device. FIG. 4 is a configuration diagram of the optical head of the optical disk device. Here, a description will be given with respect to an access process in the optical disk device having two recording layers on one side as shown in FIG. 2, wherein a recording process is applied to an optical disk in which a single spiral groove structure 101 is provided, an information track of each recording layer being capable of continuously recording from the inner periphery to the outer periphery.

An optical disk D targeted for a process of the optical disk device according to the first embodiment of the present invention is a rewritable medium which comprises a phase change recording layer as a recording layer as shown in FIG. 2. This optical disk is a recording medium which has a first recording layer 3 and a second recording layer 4 in which information recording/reproduction is carried out by a light condensed by an objective lens 5 which the optical disk device according to the present invention has. A spindle motor 2 rotates the optical disk D. A spindle motor control circuit 31 controls the spindle motor 2. More precisely, the motor 2 is controlled so that its rotational speed detected by a rotation angle encoder 30 may have a value that is desirable for the access position designated by an access control circuit 18. The optical disk D is rotationally controlled by a spindle motor 2 which the optical disk device has. In particular, a ZCLV (Zoned Constant Liner Velocity) scheme or the like for maintaining a rotational linear velocity to be constant is employed when information recording is carried out.

Further, an optical head 10 emits a laser light with a predetermined wavelength to a predetermined recording layer of the optical disk, thereby carrying out recording (mark forming). This recording is carried out by a mark length recording scheme having information on an edge of a recording mark, for example. The laser light emitted from a laser light source provided on the optical head 10 is collimated to be parallel lights, and then the parallel lights are incident to an optical correction mechanism 8 via an optical element (not shown). This optical correction mechanism 8 carries out aberration correction by a relay lens or a liquid crystal element so that an optical spot formed on a recording layer, for example, does not have a spherical aberration. The light beam corrected by this optical aberration correction mechanism 8 is further incident to the objective lens 5 via a rising mirror 7, and an optical spot is formed on a predetermined information recording face of the optical disk D. On the other hand, the light beam reflected on the information recording face is partially incident to a photo-detector 9 via the rising mirror 7 again. This photo-detector 9 detects a position error relevant to a target position of the optical spot focused on the information recording face by photoelectric conversion of detection cells divided in plurality. The position errors include a focus position error for forming an optical spot focused relevant to the information recording face, a track position error, a tilt error, and a spherical aberration error.

An information track for carrying out information recording/reproduction is formed on the information recording face. A positional deviation in the radial direction of the optical disk relevant to this target track is obtained as a track position error. A tilt error is a deviation angle between an optical axis of a light beam emitted by the objective lens 5 and a normal line of the optical disk D. If this angle is large, a comet aberration occurs in the optical spot and a spot quality is lowered. Lastly, a spherical aberration is an aberration which degrades a spot quality of the optical spot in the same manner. This aberration occurs when a wave face focused by the objective lens 5 is deviated from a spherical face.

In the optical disk device, the above various position errors are detected by a positioning error detection circuit 19 using a photo-detector 10 and a differential circuit 11 or the like, the control operation quantities corresponding to the respective positioning errors are computed by a compensation controller 20 so that a proper optical spot is formed, and the control operation quantities are input to an optical correction mechanism control circuit 21, a focus mechanism control circuit 22, a precise positioning mechanism control circuit 23, a coarse positioning mechanism control circuit 17, and a tilt adjustment mechanism control circuit 24, respectively. In each of these control circuits, the optical aberration correction mechanism 8, the objective lens positioning mechanism 6, and the coarse positioning mechanism 12 are controlled to be driven based on the input control operation quantities so that an optical spot is properly formed at a target position. Further, outputs from the differential circuit 11 are provided to a relative displacement calculator 13 and a velocity detecting portion 15, outputs of a reference velocity generation circuit 14 and the velocity detecting circuit 15 are calculated to be supplied to the coarse positioning mechanism control circuit 17 via an amplifier 16. Then, the supplied outputs control the coarse positioning mechanism 12 to be driven.

An access control circuit 18 is connected to the coarse positioning mechanism control circuit 17 and the compensation controller 20 described above, and controls access process. The access control circuit 18 controls the spindle motor control circuit 31, which in turn controls the spindle motor 2. Thus controlled, the spindle motor 2 rotates the optical disk D so that the address of the target track to be accessed may read when the access operation is started. Further, this access control circuit 18 is controlled by a system controller 25 which controls the entire operations. This system controller 25 is further connected to a recording information management portion 26 and an access target setting circuit 27. The recording information management portion 26 detects and manages a distribution of regions such as the recorded region R, the unrecorded region M, the recordable region K, and the like of the optical disk D. Unlike a conventional device, the access target setting circuit 27 determines an optimal access method according to a state by setting a position to be accessed in order to avoid the unrecorded region M which causes unstable operation as described later in detail instead of making an access to the target position with the shortest distance.

In addition to such a drive system configuration of the optical head 10, the optical disk device has configurations of a recording process system, a reproduction process system, and a control system (not shown). In other words, this optical disk device has a data reproduction circuit which is a circuit of the reproduction process system connected to the optical head 10, a laser control circuit which is a circuit of the recording process system and controls light emission of a semiconductor diode incorporated in the optical head 10, and an interface circuit for making data communication with a CPU which is a constituent element of a control portion for governing these operations, a RAM or ROM which is a storage region, and an external device, and the like.

Further, FIG. 3 shows an example of a configuration of the optical disk device according to the first embodiment of the present invention. FIG. 4 shows a detailed optical system configuration of the optical head 10 of the optical disk device according to the present invention. In these figures, a laser light emitted from a laser light source 28 is optically adjusted by an optical correction mechanism using the relay lens 8. Further, a half prism 29 is used in order to travel a return light from the optical disk D to an error signal detection system.

First Embodiment

According to the first embodiment, in an optical disk device for an optical disk having one or a plurality of recording layers, there is provided an optical disk device and an access method for the optical disk device for, when an access is made to a target position on an optical disk, providing an optimal access method while avoiding the unrecorded region M which causes unstable operation based on a distribution of the recorded region R and the unrecorded region M and the like detected in advance. FIG. 5 to FIG. 11 are diagrams each showing an example of an access method of an optical head in the optical disk device. FIG. 12 is a flow chart for explaining an access process of an optical head including an interlayer jump of the optical disk device.

Principle of Access Method of Optical Head According to the Present Invention

According to the present invention, in a recording optical disk having a recording layer, the reflection index or the like greatly differs depending on the recorded region R and the unrecorded region M. Thus, if an access is made to a target position via the unrecorded region M, a servo is likely to be unstable. Therefore, an access is made to a target position via the recorded region R or the like while avoiding the unrecorded region M based on a distribution of the recorded region R and the unrecorded region M and the like detected in advance. Further, when an access is made to a target address, in the case of a recording process, a start position of the unrecorded region M is targeted to be accessed in many cases. Thus, a second target position is set with a distance of two or more tracks, for example, of the target position instead of directly accessing the target position. After the optical head has been moved to this position, tracing is carried out at an essential target position. With this method, an unstable servo due to an effect of the unrecorded region M is avoided, enabling speedy and reliable access.

In other words, specifically, in a medium having a Low to High characteristic, the reflection index of the unrecorded region M is 10% or less. On the other hand, the reflection index of the recorded region R is 20% or more. In this case, if servo operation is carried out for forming an optical spot in the vicinity of the boundary between the recorded region R and the unrecorded region M, a component of reflection wave reflected at a low reflection index of the unrecorded region M enters a component reflected at a high reflection index of the recorded region R. Thus, there occurs a malfunction such as shifting to the unrecorded region M side of a neutral position to be applied to servo operation. In the case where the neutral position is thus shifted to the unrecorded region side, a so-called positive feedback state which is further strongly affected by the unrecorded region is established due to this shifting, where a servo is likely to be unstable. Thus, in order to particularly avoid an unstable servo state which is significant in the Low to High medium, an access is made to the target position while avoiding the unrecorded region M, or a stable access process is carried out by providing a two-stepped target position.

As shown in FIG. 5 to FIG. 11, a recording optical disk can be classified into at least an already recorded unrecordable region which is the recorded region R, a recordable region which is the unrecorded region M and into which recording can be carried out, and a recordable region which is the recordable region K and in which a deletion process is carried out although recording has been carried out once. In the access method according to the present invention, a distribution of the unrecorded region M is particularly detected, and a failure is avoided based on this detection.

Method for Identifying Unrecorded Region and Recordable Region

The following patterns are considered as a method for identifying the unrecorded region M and the recordable region K.

Pattern 1

Unrecorded region: A region in which a crystalline state or non-crystalline state is uniform.

Recorded region and recordable region: Regions in which a crystalline state and a non-crystalline state are distributed in a coexisting manner.

Pattern 2

Unrecorded region: A region in which a reflection index is uniform.

Recorded region and recordable region: Regions in which regions with different reflection indexes are distributed in a coexisting manner and regions in which average reflection index is higher or lower than in the above region in which a reflection index is uniform.

Pattern 3

Unrecorded region: A region in which dye is distributed uniformly and a reflection index is uniform.

Recorded region and recordable region: Regions where states in which partial dye film changes and reflection indexes are different from one another are distributed in a coexisting manner.

Pattern 4

Unrecorded region: A region in which a reflection face of an optical spot is flat and uniform.

Recorded region and recordable region: Regions having irregularities where the above flat portion is deformed.

Examples of Access Method

In the optical disk device according to the present invention, an optical spot is formed at a target position and a series of information is recorded as described above. However, in the case where a request for newly recording a series of information is provided to the system controller 25, the optical head 10 carries out an access process for the target position on the optical disk D. At least the cases of FIG. 5 to FIG. 11 described below are exemplified.

Access onto One Recording Layer

Figure 5:
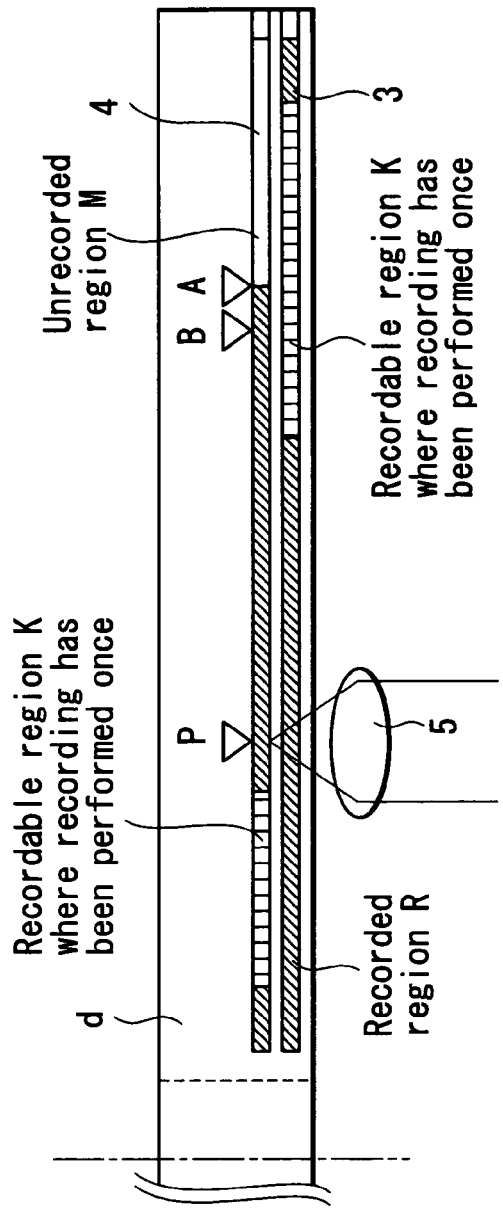
FIG. 5 is a sectional view of an optical disk showing an example of an access method in the same layer according to the first embodiment of the present invention.

An access method shown in FIG. 5 indicates a case in which an access is made on one recording layer 4. In the case where a currently tracked track is defined as point P and a target track is defined as point A, a first temporary target track is set to be point B. It is desirable that a track at point A and a track at point B are set to distant from each other by two or more tracks and 10 or less tracks. Thus, when a target track to be accessed is set in a recording layer having the unrecorded region M, the temporary target track point B is set by the working of an access target setting circuit 27 instead of making normal access for carrying out an access operation targeted for the target track. After the optical head 10 has been moved to this position, tracing is carried out at the essential target position point A, thereby enabling a stepwise and reliable access operation without being affected by the unrecorded region M.

Here, an operation for the access method carried out in one recording layer 3 shown in FIG. 5 will be described in detail by using a configuration shown in FIG. 1.

At first, an access operation is started based on a track position error signal detected by the positioning error detection circuit 19 by temporarily releasing track positioning control for carrying out positioning control by the access control circuit 18. When this track positioning control has been released and the control operation quantities are input from the respective control circuits to the coarse positioning mechanism 12 or the precise positioning mechanism 6, an optical spot starts moving in the radial direction of the optical disk. Although a track position error (a tracking error) occurs due to this movement, the access operation is controlled by using this position error signal. At the same time the access operation is started, the spindle motor control circuit 31 controls the spindle motor 2 so that the motor 2 may acquire the rotational speed preset when the optical head reaches the target track.

In the access control circuit 18, a track position error signal is binarized by the relative displacement calculator 13 and the thus binarized signal is counted, whereby the number of information tracks moved by an access can be recognized. In the access control circuit 18, the number of information tracks to be accessed is calculated in advance from an address of an information track targeted for an access and an address of an information track for starting an access. The number of passed tracks is subtracted from the number of target accesses so that the number of remaining tracks can be calculated. With respect to the thus calculated number of remaining tracks, the access control circuit 18 generates a target velocity from a reference velocity generation circuit 14 in which a target movement velocity is already defined as a reference value. On the other hand, when an interval of information tracks is divided by a time interval of a rising pulse of the binarized track position error signal, the movement velocity during each track passing can be detected. This detection is carried out by the velocity detector 15. The above target velocity is compared with the detected velocity by a comparator detector 16 so that the detected velocity follows the above target velocity. Then, a differential value is amplified to be input to the coarse positioning mechanism control circuit 17.

Further, depending on a position relationship between a target track and an optical spot, the above differential value is input to the precise positioning mechanism control circuit 23 via the access control circuit 18 to drive the precise positioning mechanism 6. When an optical spot reaches immediately before a target track, the access control circuit 18 closes the track position error control system again. Then, the compensation controller 20 calculates the control operation quantity for driving the precise positioning mechanism so as to eliminate a track position error and provides the calculated quantity to the precise positioning mechanism control circuit 23. Thereafter, an address of the actually reached target track is read by a signal process system of the system. However, in the case where this address is substantially identical to that of a target information track, an access operation for the temporary target track point B is terminated. Thereafter, the optical head is moved from point B to point A by a trace operation for keeping a tracking state instead of an access seeking operation. At this time, the spindle motor control circuit 31 controls the spindle motor 2 so that its rotational speed changes from the value preset for point A to the value preset for point B.

During the above access operation, the control circuit 20 outputs the control operation quantity for adjustment to the optical correction mechanism control circuit by using an amplitude value of a signal detected by the positioning error detection circuit 19, for example, of a track position error signal. Then, this circuit can search for an optimal correction point by driving the optical correction mechanism. This control operation quantity for adjustment is obtained as a value such as Vc' relevant to the control operation quantity Vc during an access in accordance with Vc'=Vc+ΔV, where ΔV indicates a value obtained when an absolute value is determined in a predetermined range and a sign is properly inverted.

A region which has not been recorded intentionally due to an effect such as defect or a region in which recording cannot be carried out may be defined as the unrecorded region M.

Access 1 with Interlayer Jump

Figure 6:
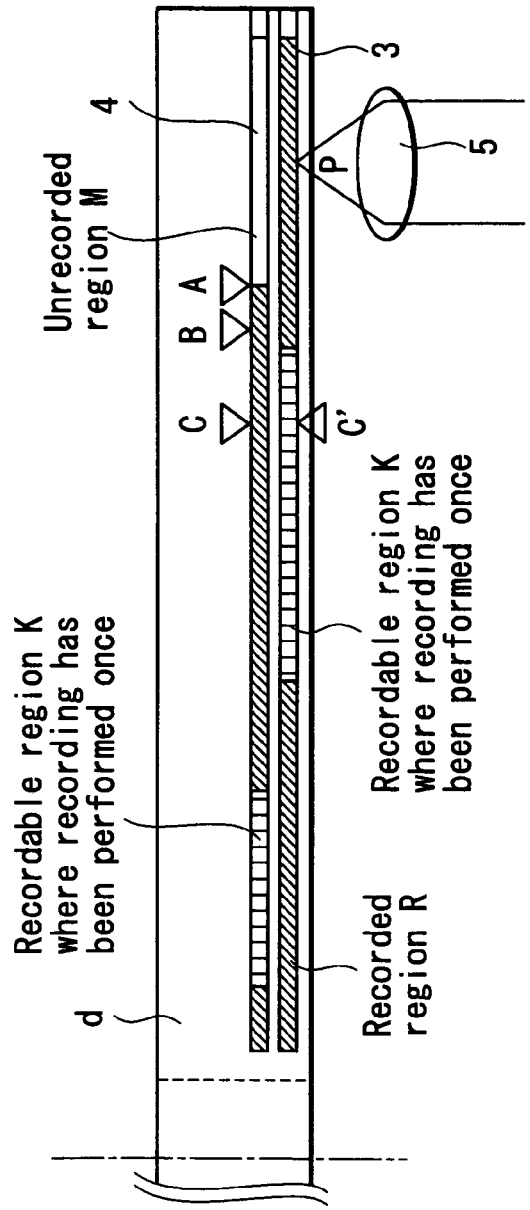
FIG. 6 is a sectional view of an optical disk showing an example of the access method with an interlayer jump according to the first embodiment of the present invention.

Next, an access method shown in FIG. 6 indicates a case of carrying out an interlayer jump among a plurality of recording layers while avoiding the unrecorded region M. In the case where a currently tracked track is defined as point P and a target track is defined as point A, a first temporary target track is set to be point B. It is desirable that a track at point A and a track at point B are set to be distant from each other by two tracks or more and 10 tracks or less.

On the other hand, a second temporary target track for an interlayer jump is set to be point C. A third temporary target track corresponding thereto in another recording layer 3 is set to be point C'. It is desirable that point B and point C are set to be distant from each other by about 0.1 mm or more. When a target track to be accessed is thus set in a recording layer having the unrecorded region M, a temporary target track is set by the access target setting circuit 27 and a stepwise access operation is achieved unlike a general access operation for carrying out an access operation for the target track.

In this manner, an access is made in descending order of points P, C', C, B, and A, whereby an access operation is also carried out for an optical disk having a plurality of recording layers 3 and 4 and having the unrecorded region M while only the recorded region R is passed with the unrecorded region M being avoided. Thus, a stable access operation can be carried out. When the optical head jumps from point C' to point C, too, the spindle motor 2 is controlled to acquire first the speed preset or point C' and then the speed preset for point C. If points C' and C are at almost the same distance from the center of the disk D, it is desired that the motor 2 be controlled to rotate at the same speed for points C' and C.

Access 2 with Interlayer Jump

Figure 7:
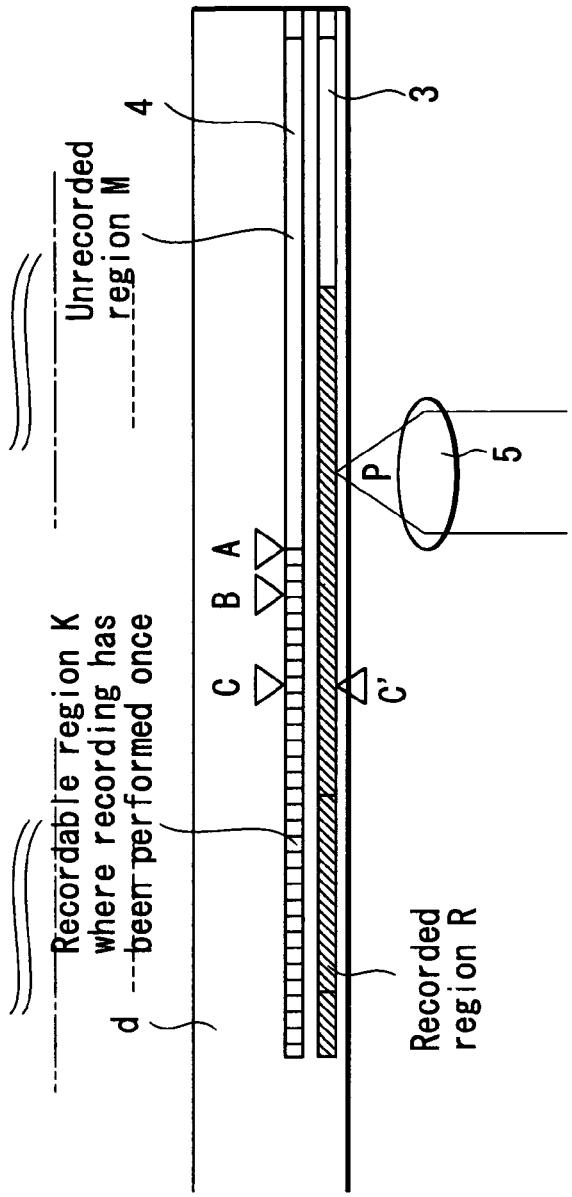
FIG. 7 is a sectional view of an optical disk showing another example of the access method with an interlayer jump according to the first embodiment of the present invention.

An access method shown in FIG. 7 indicates a case of carrying out an interlayer jump among a plurality of recording layers while avoiding the recorded region M. This access method also indicates a case in which the unrecorded region M exists in the current recording layer 3 as well. Also in this case, an access can be made in the same manner as in the access method shown in FIG. 6. In other words, in the recording information management portion 26, it is determined that temporary target track points C', C, and B are not in the unrecorded region M and an access is made in descending order of points P, C', C, B, and A so that a stable access operation can be carried out.

Access 3 with Interlayer Jump

Figure 8:
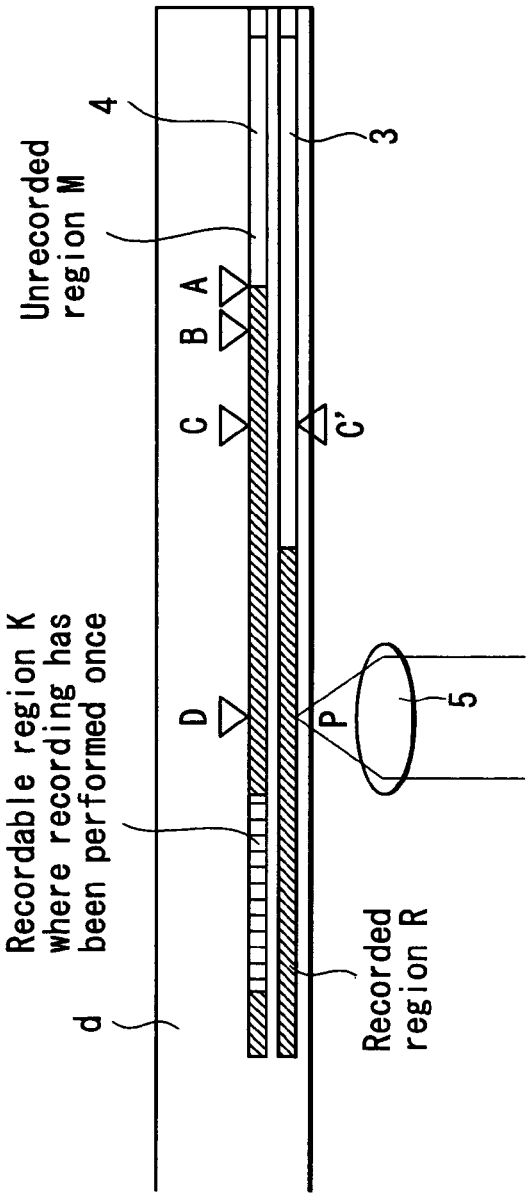
FIG. 8 is a sectional view of an optical disk showing another example of the access method with an interlayer jump according to the first embodiment of the present invention.

An access method shown in FIG. 8 indicates a case in which an interlayer jump is carried out among a plurality of recording layers while avoiding the unrecorded region M similarly. This access method also indicates a case in which an interlayer jump is carried out as is without moving in the current recording layer 3. In other words, in the recording information management portion 26, when it is determined that point C' in the figure is in the unrecorded region M and track point D of the recording layer 4 corresponding to track point P at which a current optical spot is formed is in the recorded region R, an interlayer jump is carried out for point D and moves to the first temporary target track point B in the recording layer 4. Then, tracing is carried out for target position point A, thereby enabling a reliable access operation without being affected by the unrecorded region M.

Access 4 with Interlayer Jump

Figure 9:
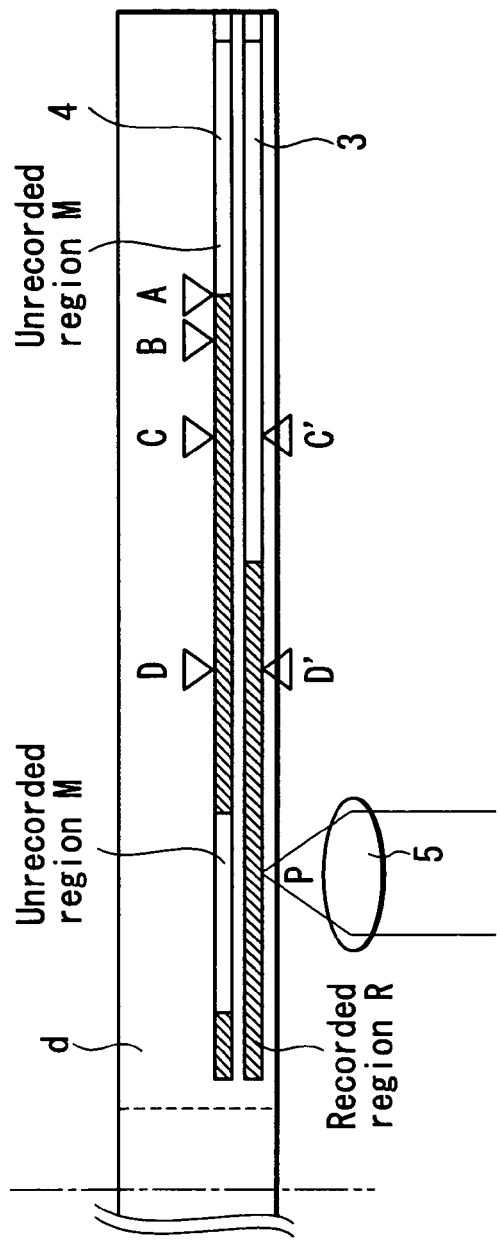
FIG. 9 is a sectional view of an optical disk showing another example of the access method with an interlayer jump according to the first embodiment of the present invention.

An access method shown in FIG. 9 indicates a case in which an interlayer jump is carried out among a plurality of recording layers while avoiding the unrecorded region M similarly. This access method indicates a case in which an interlayer jump is carried out by moving in the current recording layer 3 in a forward direction and tracing is carried out for a target position by moving in the forward direction again. In other words, in the recording information management portion 26, it is determined that point C' in the figure is in the unrecorded region M, and an access is determined by the access target setting circuit 27 in descending order of points P, D', D, B, and A. In the case of FIG. 6 or FIG. 7, first movement in the recording layer 3 is in a direction opposite to the forward direction. In contrast, this example is characterized in that the first movement is in the forward direction.

Description of Operation Using Flow Chart: Access Method in the Same Recording Layer Now, the access method in the same recording layer shown in FIG. 5 will be described below in detail by using a flow chart of FIG. 12. In the flow chart of FIG. 12, at first, in the case where the system controller 25 receives a request for information recording (ST11), the system controller 25 checks whether or not information concerning the capacity of information to be recorded is contained. In the case where the capacity of information to be recorded is found as a result of this check, the process proceeds to the next step referring to information on the capacity of recording information. In the next step, the recording information management portion 26 of FIG. 1 checks a recording region which can be recorded in a recording layer on which an optical spot is currently formed, that is the capacity and position of the recordable region K and the capacity and position of the unrecorded region M (ST12) and further checks the residual region and position of the information recording region K which can be recorded in another recording layer, that is the capacity and position of the unrecorded region M (ST13).

Then, the access target setting circuit 27 determines/selects a recording layer in which information should be recorded and a target track position by using information on the two checked recording layers (ST14). At the same time, in the case where the unrecorded region M exists in a recording layer to be accessed, or particularly in the case where an access is made in the vicinity of the unrecorded region M or recording is carried out for the unrecorded region M, the access target setting circuit 27 sets a first temporary target track (point B) in a recording layer to be targeted. In addition, in the case where it is determined that a recording layer to be accessed differs from a current recording layer, this setting circuit 27 sets a second temporary target track (point C) in a recording layer to be targeted and a third temporary target track (point C') in a current recording layer so as to start the access operation.

In this manner, as is the case in FIG. 5, as a result of selecting a recording layer and selecting/setting a target track and a temporary target track, it is determined that recording is carried out in a current layer on which an optical spot is formed. In the case where the unrecorded region M exists in the current recording layer and recording is carried out in the unrecorded region M, an access operation for the first temporary target track (point B) is carried out at first. In the access operation, the spindle motor 2 is controlled to acquire a rotational speed preset for a temporary target track. (ST15). At a stage where an address is read and the access is terminated, an access operation for a target track (point A) is carried out (ST16) and information recording is started (ST17). In this access operation for the target track in ST16, since the first temporary target track is set to achieve an access operation with comparatively short distance, this access operation can be achieved by an access caused by a track jump using the precise positioning mechanism 6 or by maintaining a trace state.

Description of Operation Using Flow Chart: Access Method with Interlayer Jump

Now, a description of an operation in the case where the unrecorded region M does not exist in a current layer (FIG. 6) will be given with respect to an operation of accessing a predetermined recording start position of a recording target layer when it is determined that recording is carried out in a recording layer different from a recording layer on which an optical spot is formed in the selection (ST14) of the recording layer in the flow chart of FIG. 12.

In this access method, as in the access method in the same recording layer described above, the first temporary target track (point B) is set by the access target setting circuit 27, and the second temporary target track (point C) and the third temporary target track (point C') are simultaneously set (ST18). In the case where the unrecorded region M does not exist in the current recording layer, or in the case where it is determined at the recording information management portion that the unrecorded region M is not passed on the way of the access operation, the second temporary target track (point C) is provided at a recorded region side far from the first temporary target track (point B). The address of the current layer which substantially corresponds to that of this second temporary target track is calculated in the recording information management portion 26. Further, the track of the current recording layer having the calculated address is determined as the third temporary target track (point C') by the access target setting circuit 27.

Hereinafter, an operation of accessing the third temporary target track (point C') is carried out along the flow chart of FIG. 12 (ST19). Further, at a stage where an address is read and the access is terminated, an interlayer jump is then carried out (ST20) and focus pull-in action (ST21), track pull-in action (ST22), and a variety of servo adjusting operations are carried out. In this access operation, the spindle motor 2 is controlled to acquire two different speeds preset for points C and C', respectively.

Since this interlayer jump can be controlled as a part of the focus positioning operation after track positioning control has been released, the interlayer jump can be achieved by providing the control operation quantity to the focus mechanism control circuit 22 by the compensation controller 20. If an interlayer jump is carried out from a track of a current recording layer which corresponds to a predetermined recording position of a recording target layer, the jump reaches the vicinity of the predetermined recording position of the recording target layer and focus pull-in action is carried out so that focus positioning control is carried out. At this time, at the same time with the interlayer jump, the optical correction mechanism control circuit 21 adjusts the optical correction mechanism so that a proper optical spot is formed with respect to the recording target layer. As a result, since focus positioning control can be carried out for a recording target layer, track positioning control is carried out based on a track position error detected by the track positioning error detection circuit 19. An optical spot is track-positioned with respect to a retractable information track by this track positioning control, making it possible to read an address. Although the address of the pulled-in track is read, this address may not always coincide with the second temporary target track (point C). A distance up to the recording start position is calculated from this address reading result and an access operation in the same recording layer described above is carried out so that an operation of accessing the first temporary target track (point B) is carried out (ST23). After track pull-in action is carried out (ST24) and it is confirmed that an access to the first temporary target track (point B) can be successfully made, an operation of accessing the target track (point A) such as a short distance jump is carried out (ST25) and the access operation is terminated so that information recording is started (ST26).

In this operation of accessing the target track (point A) in ST25, the first temporary target track (point B) is set to ensure the access operation with a comparatively short distance as in the previous embodiment. Thus, this access operation can be achieved by track jump access using the precise positioning mechanism 6 or by maintaining a trace state.

Simple Access Method

Figure 10:
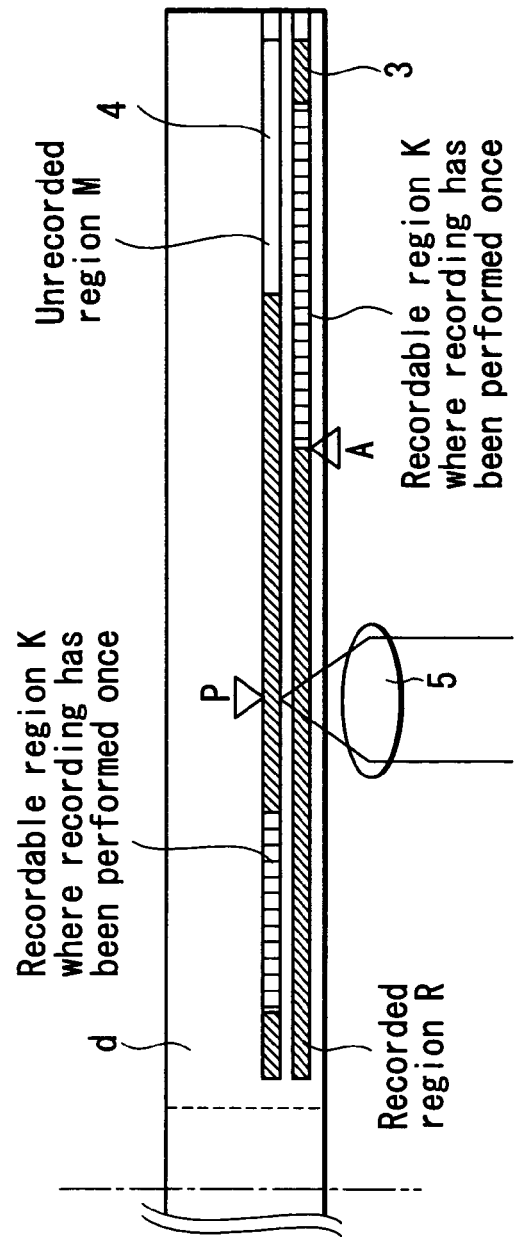
FIG. 10 is a sectional view of an optical disk showing an example of a simple access method with an interlayer jump according to the first embodiment of the present invention.

An access method shown in FIG. 10 is a simple and practical access method. In FIG. 10, in the case where the unrecorded region M exists in the recording layer 4 in which a current optical spot (point P) is formed, and the unrecorded region M does not exist in the target recording layer 3 in which the track point A to be recorded exists, there is provided an access method for immediately carrying out an interlayer jump at that position. In other words, the step (ST19) in which the third temporary target track (point C) is provided is omitted and an interlayer jump to the recording target layer 3 is first carried out (ST20). Thereafter, in the recording target layer 3, the step (ST23) in which the first temporary target track (point B) is provided is omitted, and an operation of accessing the target track (point A) is carried out.

Thus, the temporary target track (such as points C, C', B, or the like) is omitted only in the above case and an access is immediately made, whereby, if the recording information management portion 26 and the access target setting circuit 27 are also provided, an access operation is carried out with respect to an optical disk having a plurality of recording layers and having the unrecorded region M by always passing through the recorded region R, making it possible to carry out a more speedy and stable access operation.

(Restore Process from Runaway State)

Figure 11:
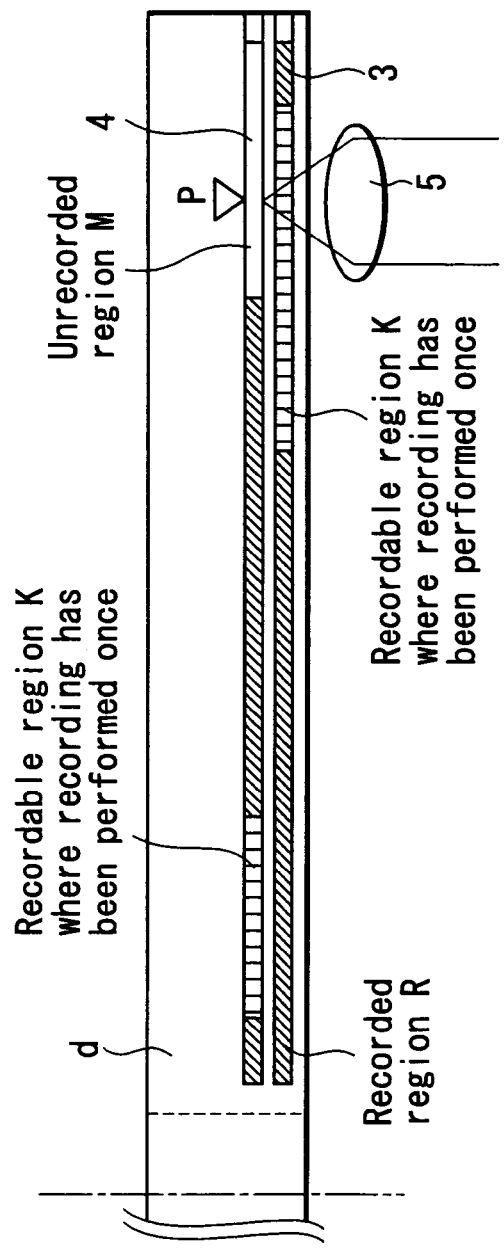
FIG. 11 is a sectional view of an optical disk showing an example of the access method in the case where a runaway state occurs according to the first embodiment of the present invention.
Figure 12:
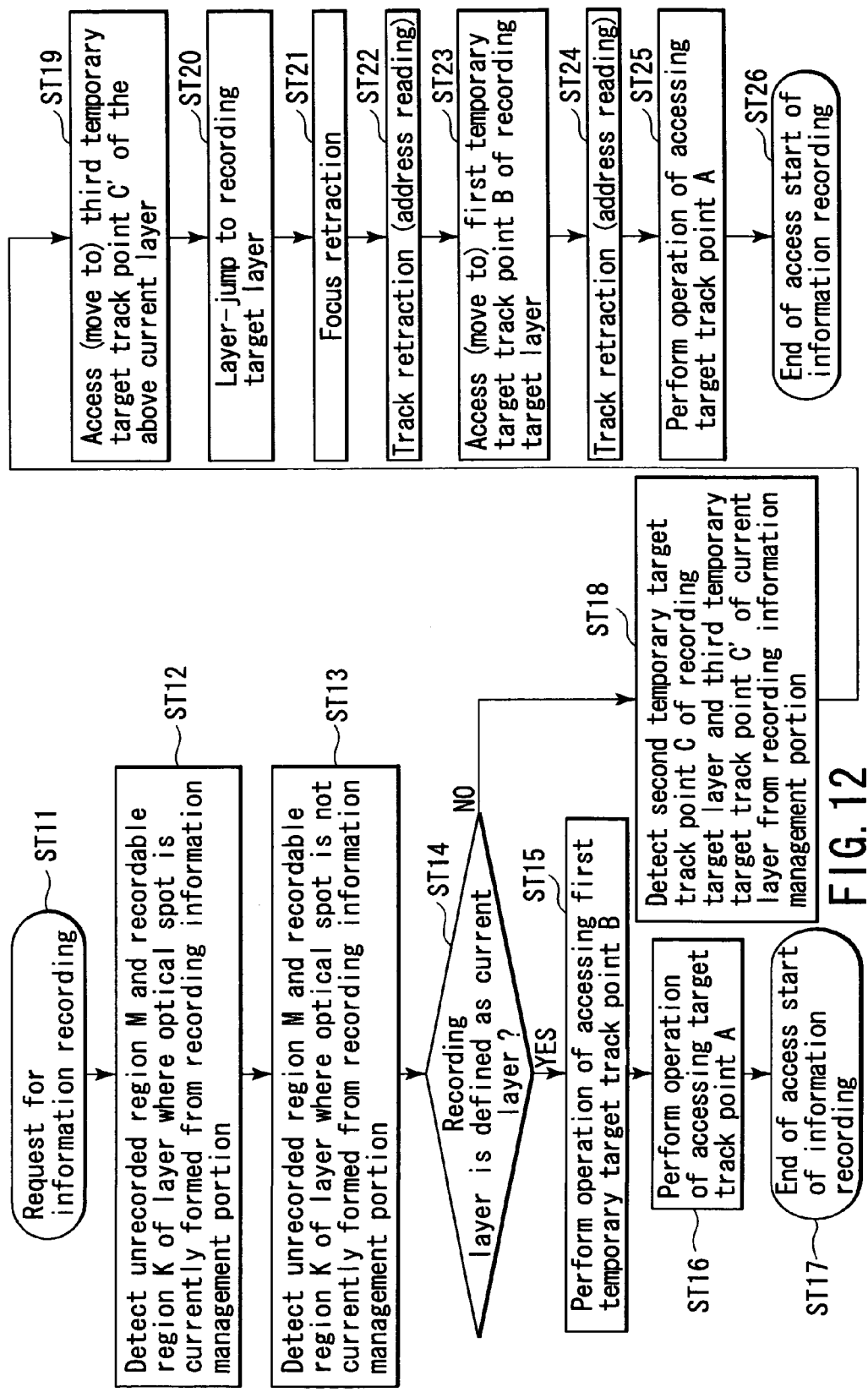
FIG. 12 is a flow chart for explaining the access method according to the first embodiment of the present invention.

FIG. 11 illustrates a coping method in the case where an optical spot has been formed unintentionally in the unrecorded region M due to runway or track deviation during an access, focus deviation, and the like. As shown in FIG. 11, a tracking may occur unintentionally in the unrecorded region M due to a certain disturbance during an access operation as is the case with point P in the figure. In some cases, such a situation may occur even in a constant tracking servo state.

Figure 20:
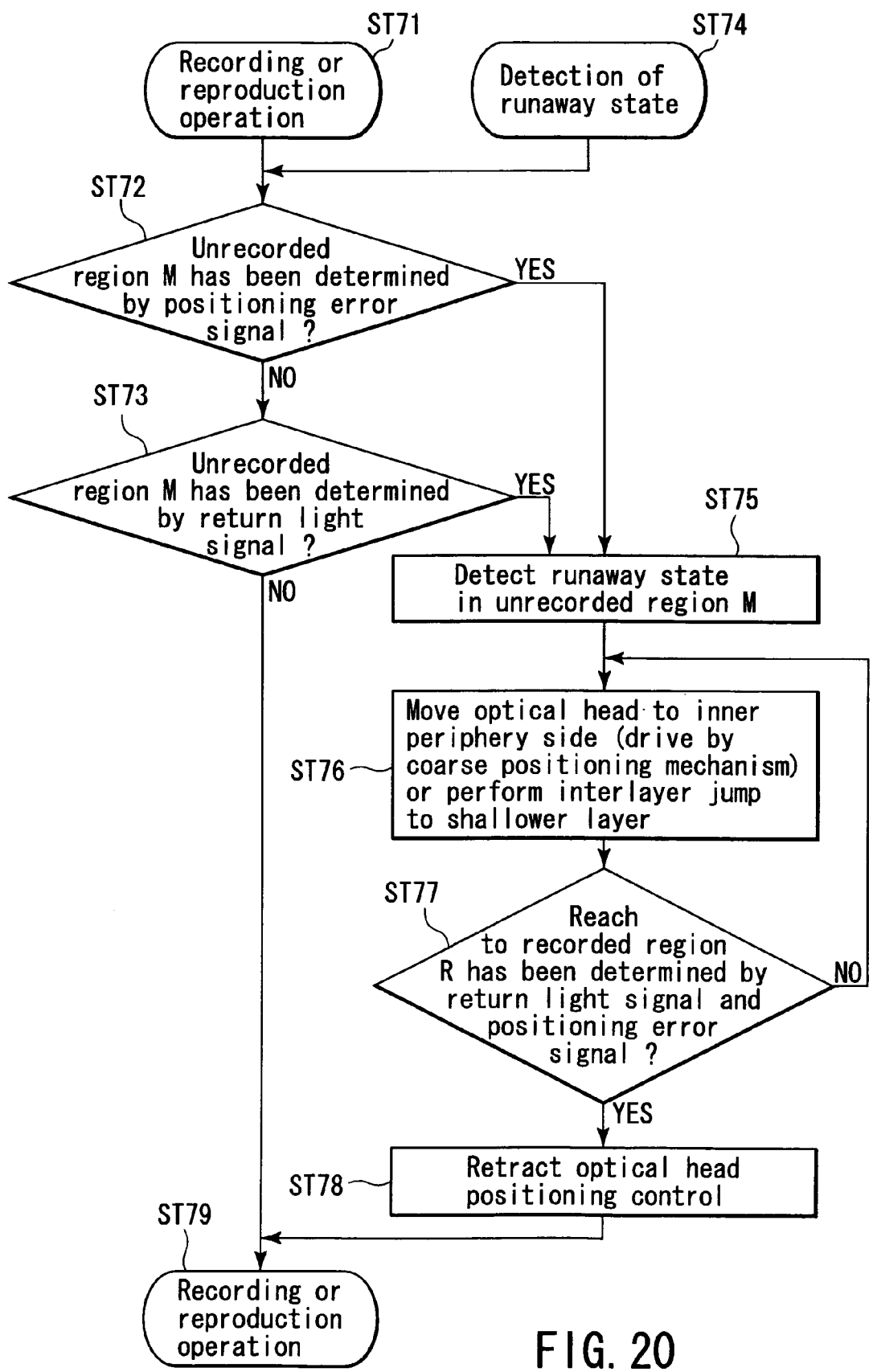
FIG. 20 is a flow chart for explaining a restore process from a runaway state according to the present invention.

In other words, in the flow chart shown in FIG. 20, in the case where a runaway state has been detected (ST74) during recording/reproduction operation (ST71), this state is detected by the positioning error detection circuit 19. In other words, for example, in the case where a change in amplitude of a focus positioning error signal or a change in a track positioning error signal is detected so that the detected change is determined to be the unrecorded region M (ST72), or in the case where the detected change is determined to be the unrecorded region M by a return light signal (ST73), the runaway state in the unrecorded region M is detected (ST75). Then, before operating a variety of servo operations other than the focus positioning, the optical head 10 itself is moved in the inner periphery direction by the coarse positioning mechanism 12 (ST76).

The optical head is thus moved in the inner periphery direction, thereby making it possible to move an optical spot to the recorded region R of FIG. 11. Movement to the recorded region R can be detected by the positioning error detection circuit 19 similarly. Note that the rotational speed of the spindle motor 2 is controlled in accordance with the distance from the center of the disk D to the track from which an address should be read. In addition, even in the case where an optical spot is moved to the innermost periphery by this movement process, if it is determined that the recorded region R has not been reached successfully, an interlayer jump for changing a recording layer is carried out to handle it (ST76, ST77). After optical head positioning control is pulled-in (ST78), the process returns to recording or reproduction operation (ST79).

When the unrecorded region M has been reached unintentionally in this manner, pull-in action to the inner periphery side or a correlation jump is carried out, thereby rapidly escaping from the unrecorded region M without making a servo state unstable, and making it possible to achieve stable operation.

A determination that the unrecorded region M has been reached unintentionally may be made by using information that no data is sent from a signal process system.

A description is given with respect to an operation of accessing a recording operation request. An operation of accessing a reproduction operation request can be carried out similarly.

In addition, in the case of the present embodiment, when a runaway state is detected, a direction in which the optical head 10 itself is moved by the coarse positioning mechanism 12 is correspondingly switched to the inner periphery side or the outer periphery side using information on a recording scheme of a layer on which an optical spot is formed, and is controlled so as to always reach the recorded region R or the recordable region K.

Second Embodiment

Figure 13:
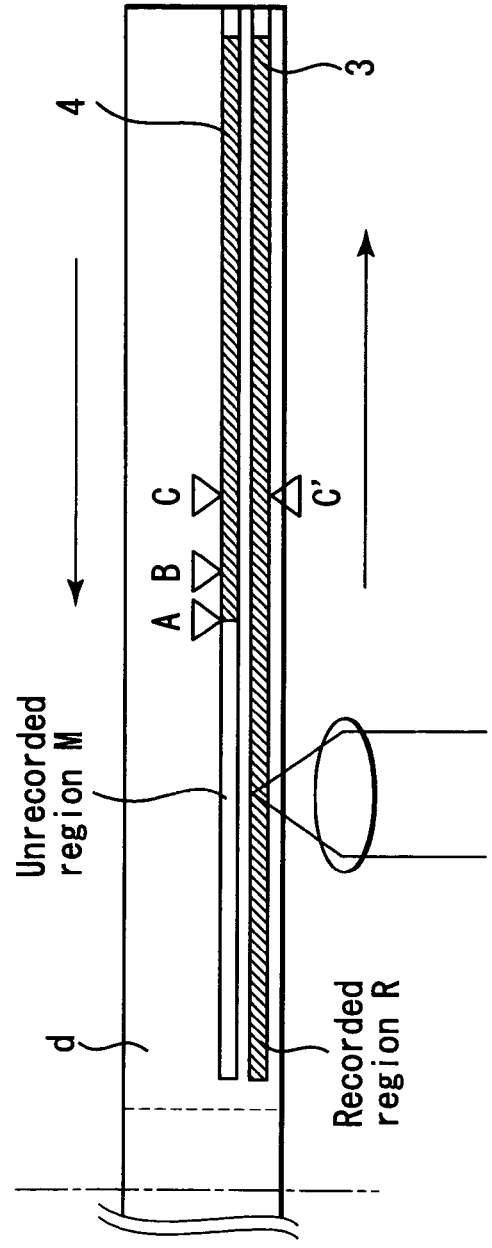
FIG. 13 is a sectional view of an optical disk showing an example of an access method with an interlayer jump according to a second embodiment of the present invention.

According to a second embodiment, there is provided an optical disk device and an access method for the optical disk device which handle an optical disk having the characteristics of the first embodiment and having a plurality of recording layers, the optical disk having a track structure in which at least one recording layer carries out a recording process in a direction from the outer periphery side to the inner periphery side. FIG. 13 is a sectional view of an optical disk showing an example of an access method with an interlayer jump according to the second embodiment of the present invention.

In the optical disk handled according to the second embodiment, at least one of a plurality of recording layers carries out a recording process in a direction from the outer periphery side to the inner periphery side. The optical disk shown in FIG. 13 has two recording layers on one side, and a track structure thereof is provided as a groove structure, where the recording layer 3 carries out a recording process in a direction from the inner periphery to the outer periphery as a general direction and the recording layer 4 has a track structure for carrying out a recording process in a direction from the outer periphery to the inner periphery.

In the optical disk device for carrying out recording/reproducing for an optical disk with such a disk structure, the optical disk structure and the access process procedures shown in the flow chart of FIG. 12 are identical to those according to the first embodiment and a description thereof will be omitted. The second embodiment is characterized in that a track structure of the second recording layer 4 is provided as a recordable structure from the outer periphery to the inner periphery, so that the first temporary target track (point B) is provided at the outer periphery side than point A and the second temporary target track (point C) and the third temporary target track (point C') are provided at the outer periphery side than point A similarly.

In the second embodiment, in the conventional device, if an interlayer jump is carried out from the inner periphery side, a jump to the unrecorded region M occurs very often and an unstable servo state is inevitable. However, in the access method according to the present invention, it is possible to make an access while the recorded region R is always passed. Therefore, there can be provided an optical disk device and an access method for the optical disk device enabling a reliable access process based on a stable servo operation.

Third Embodiment

Figure 14:
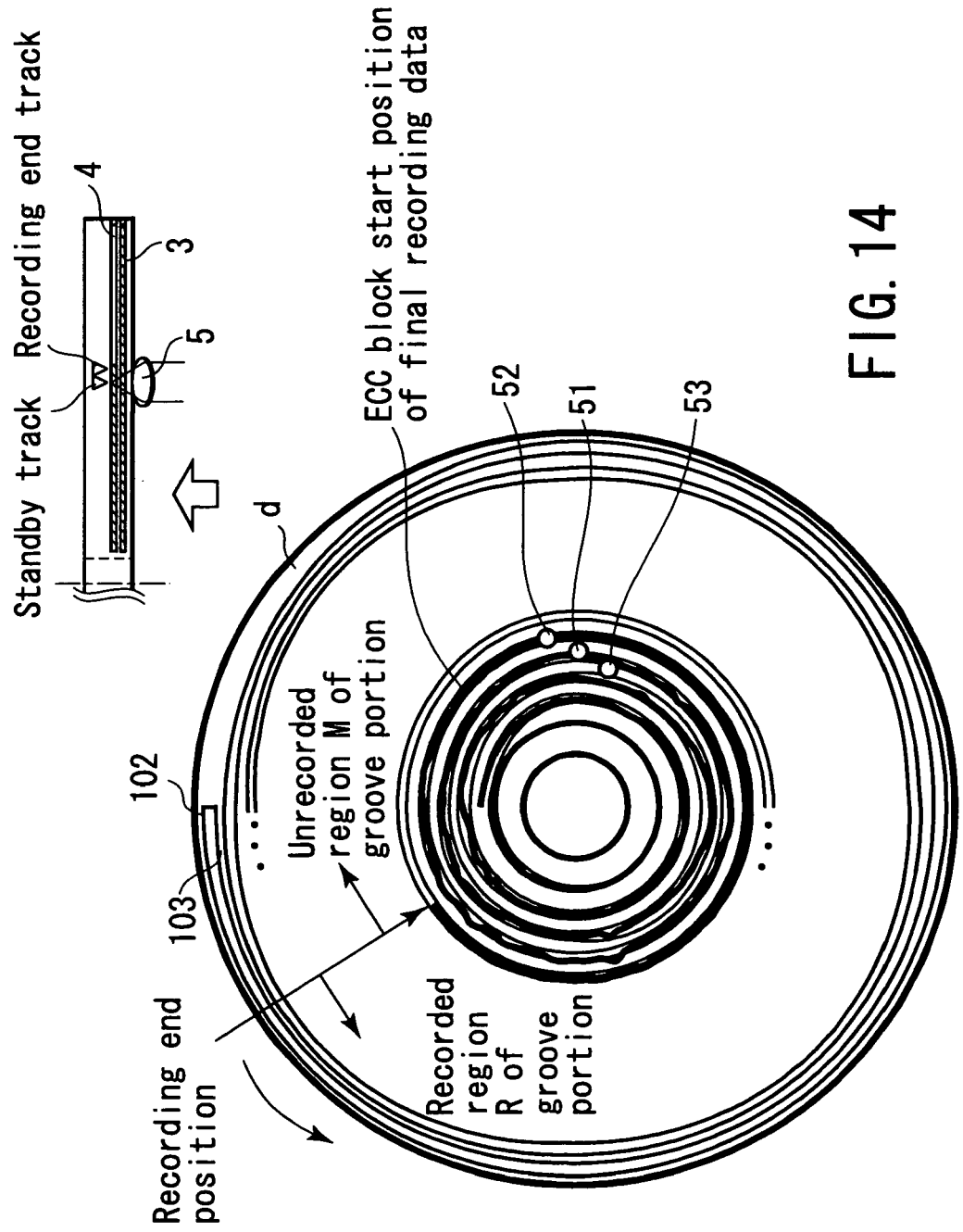
FIG. 14 is a view of an optical disk showing an example of an access method according to an optical disk which has a land portion and a groove portion according to a third embodiment of the present invention.
Figure 15:
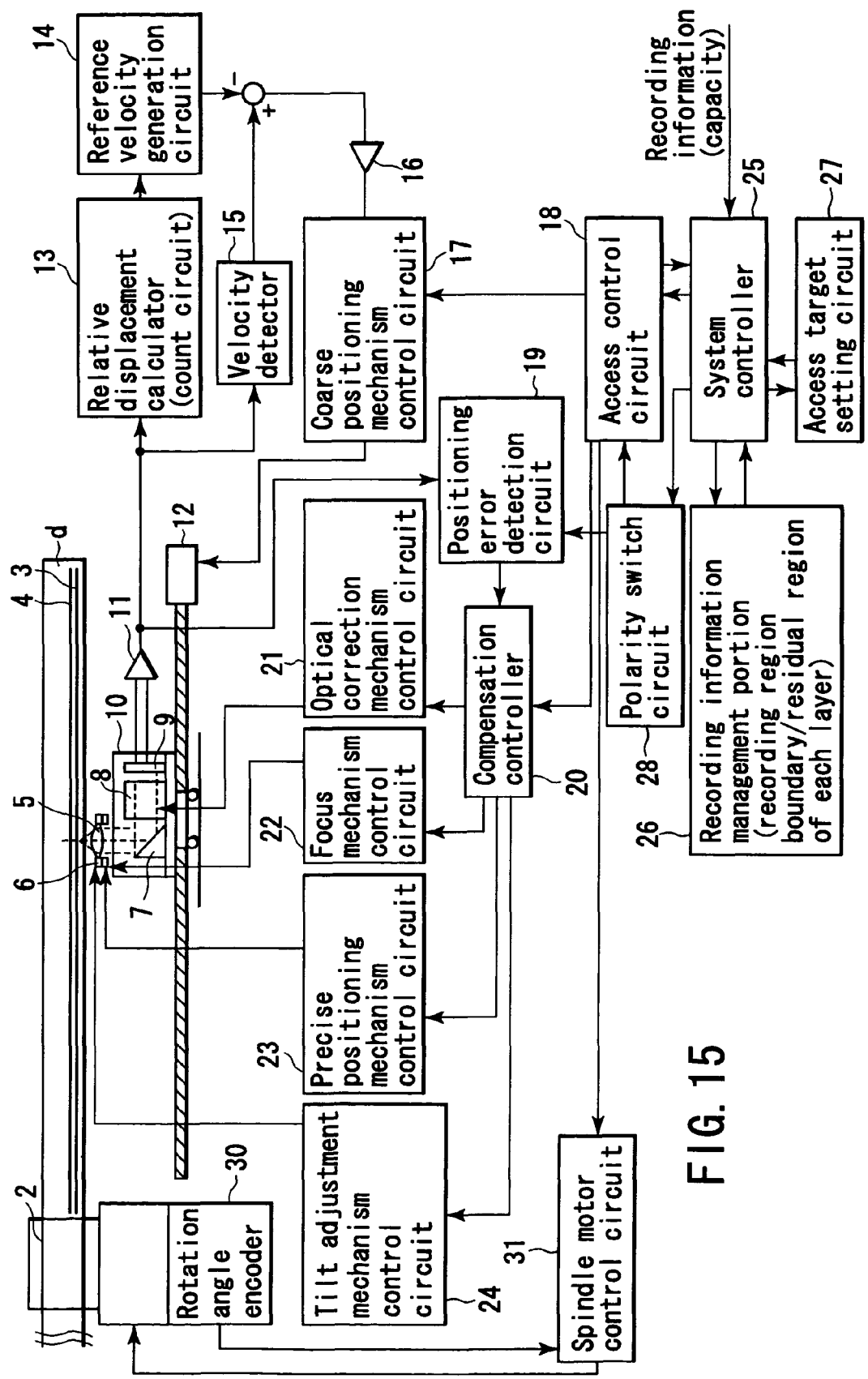
FIG. 15 is a block diagram showing an example of a configuration of an optical disk device according to the third embodiment of the present invention.
Figure 16:
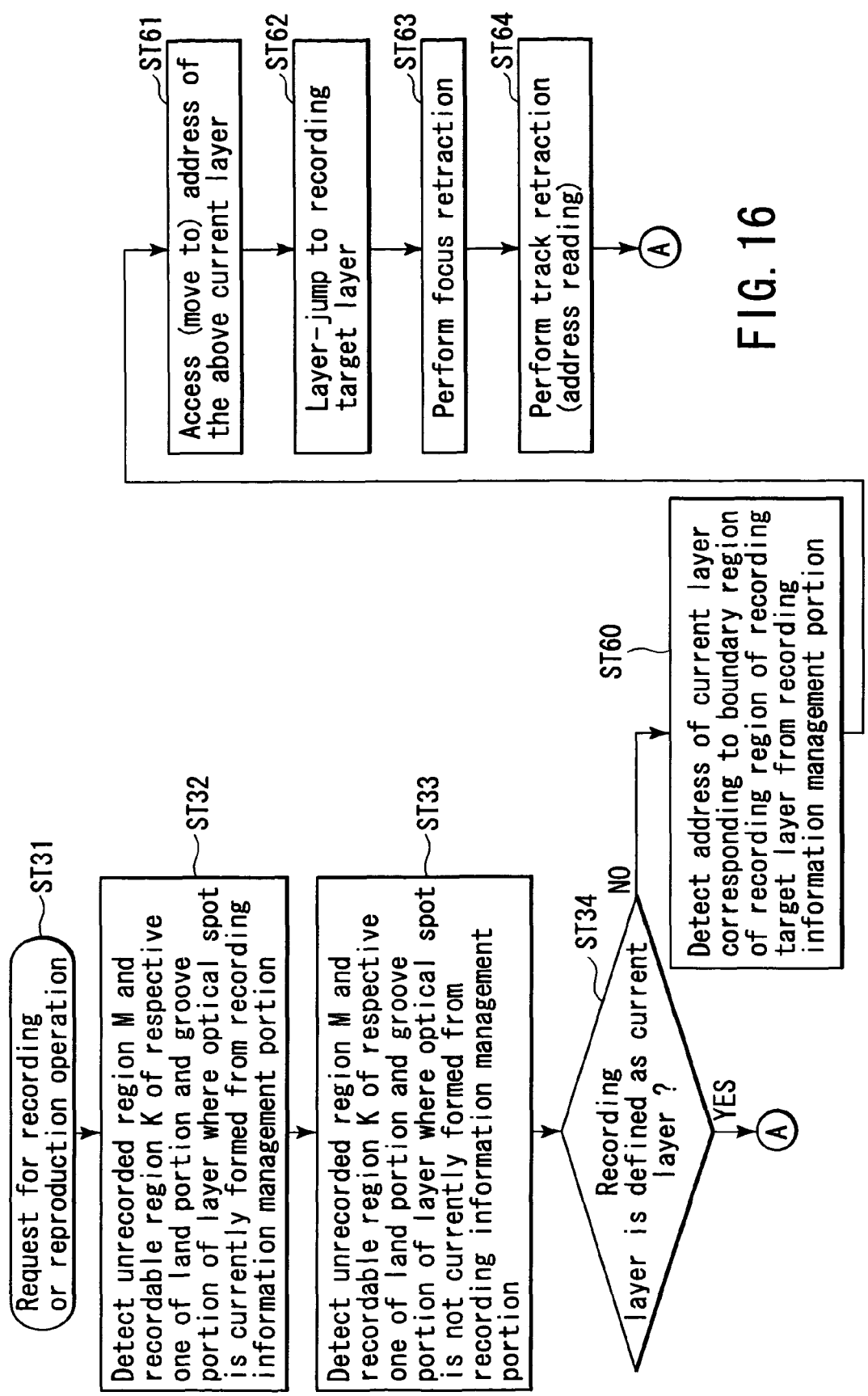
FIG. 16 is a flow chart for explaining an access method according to the third embodiment of the present invention.
Figure 17:
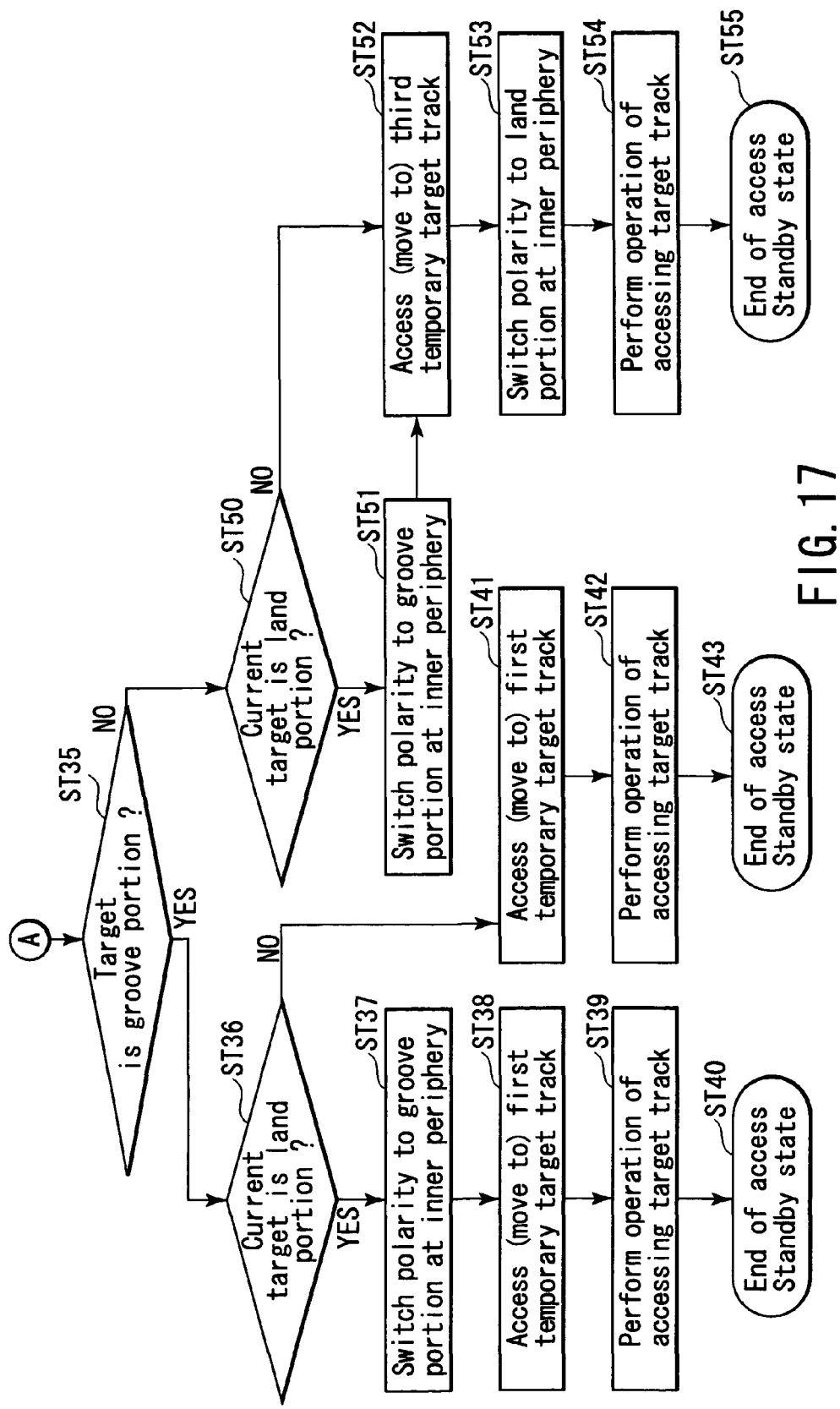
FIG. 17 is a flow chart for explaining the access method according to the third embodiment of the present invention.
Figure 18:
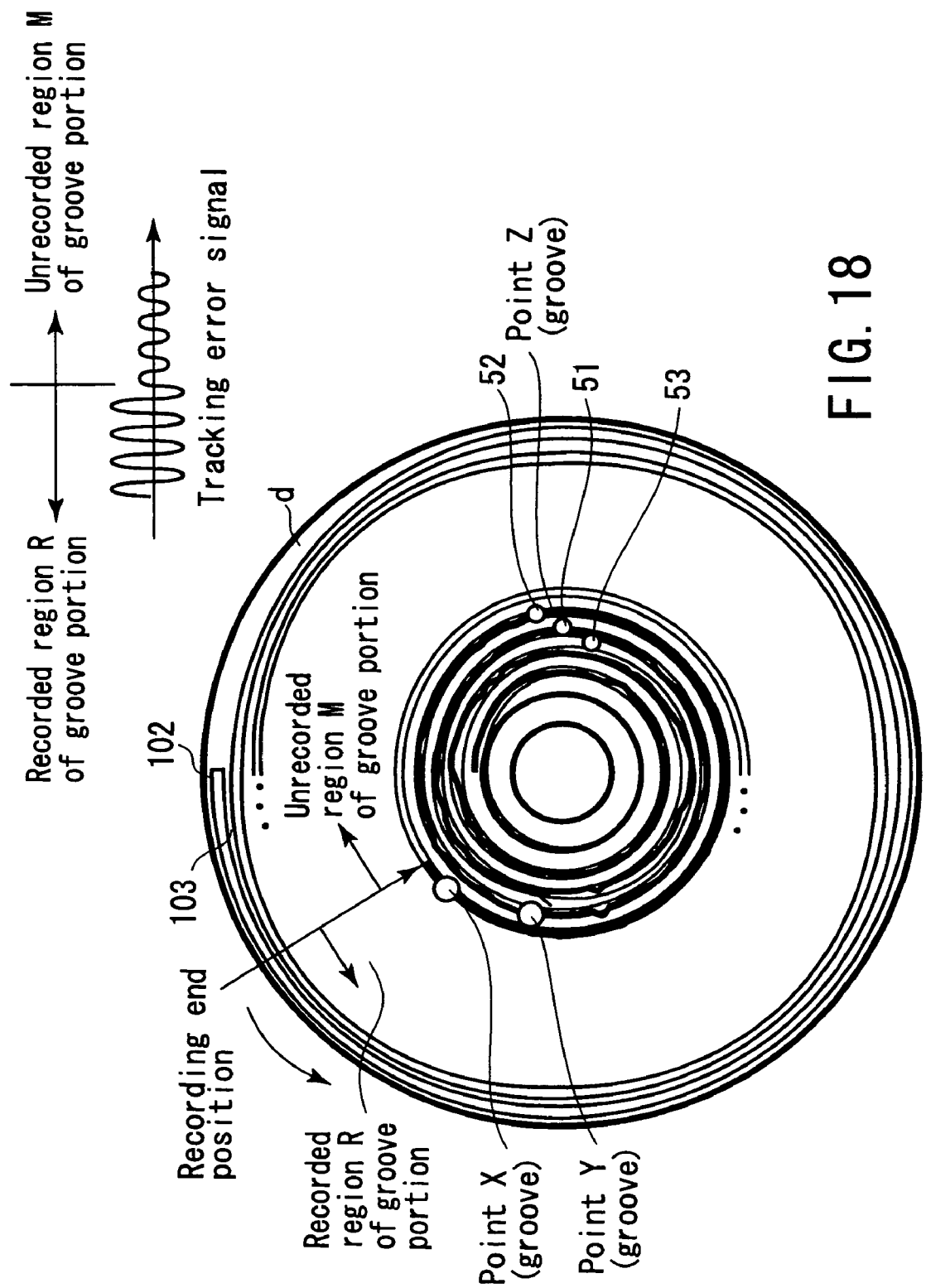
FIG. 18 is a view of an optical disk showing another example of the access method according to an optical disk which has a land portion and a groove portion according to the third embodiment of the present invention.
Figure 19:
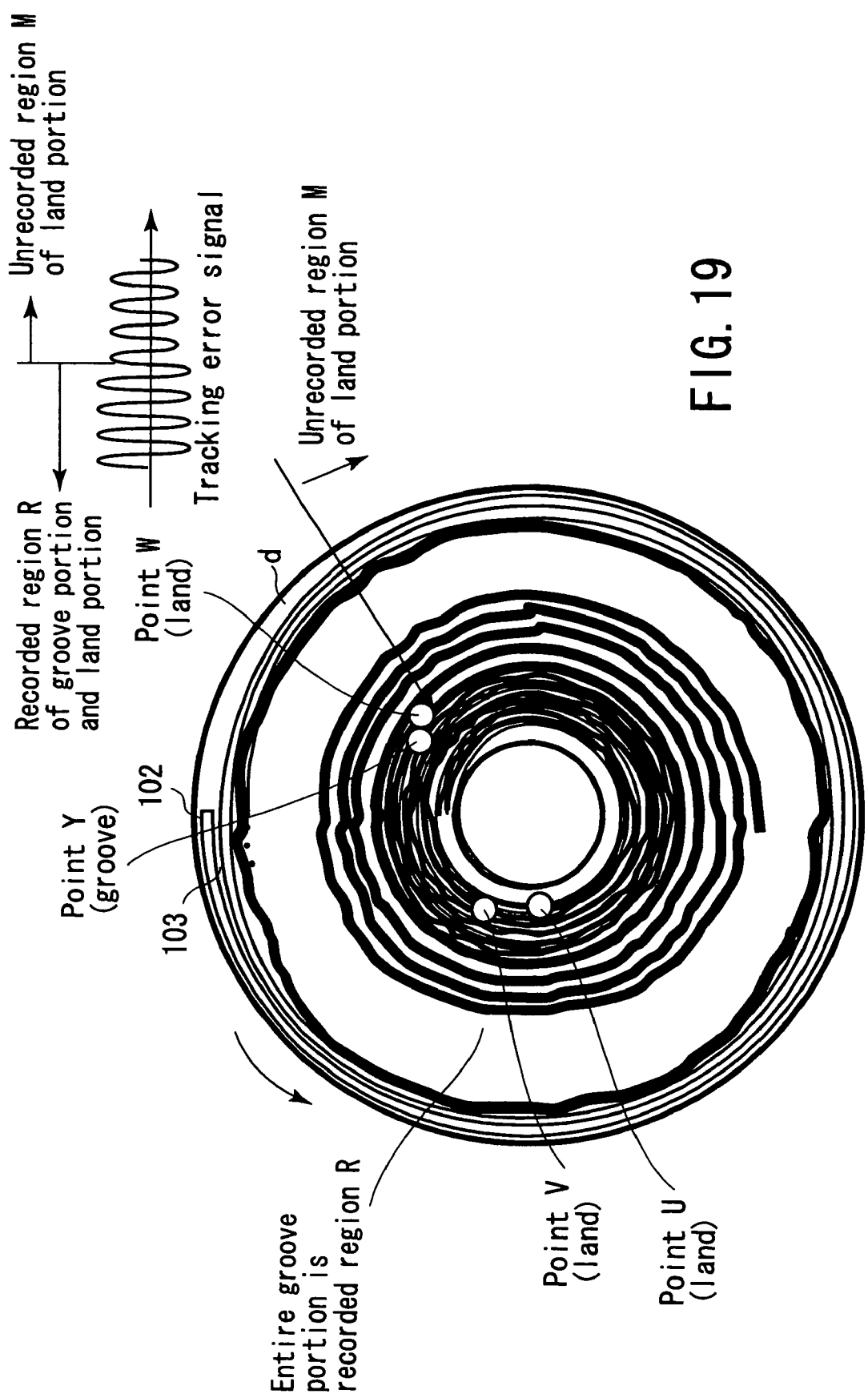
FIG. 19 is a view of an optical disk showing another example of the access method according to an optical disk which has a land portion and a groove portion according to the third embodiment of the present invention.

According to a third embodiment, there is provided an optical disk device and an access method for the optical disk device which handle an optical disk having characteristics according to the first embodiment and having a plurality of recording layers, where at least one recording layer has a track structure composed of a land portion and a groove portion. FIG. 14 is a view of an optical disk showing an example of an access method according to an optical disk having a land portion and a groove portion according to the third embodiment of the present invention. FIG. 15 is a block diagram showing an example of a configuration of the optical disk device according to the third embodiment of the present invention. FIG. 16 and FIG. 17 are flow charts for explaining the access method according to the third embodiment of the present invention. FIG. 18 and FIG. 19 are views of an optical disk each showing another example of the access method according to an optical disk having a land portion and a groove portion according to the third embodiment of the present invention.

The optical disk handled by the optical disk device according to the third embodiment has two recording layers on one face as shown in FIG. 14. This optical disk is targeted for an optical disk having a track structure composed of a groove portion 102 and a land portion 103.

In addition, the optical disk device according to the third embodiment has a structure which is substantially identical to that according to the first embodiment and a description of common portions will be omitted. For the land portion and the groove portion, a polarity switch circuit 28 operationally controlled by the system controller 25 is newly provided to carry out switching between the land portion and the groove portion. The information recording or reproducing operation has the same purpose as in the first embodiment, and a process including a switching process between the groove portion and the land portion is described by way of the flow charts of FIG. 16 and FIG. 17.

In the case where the groove portion and the land portion are provided in a recording optical disk, recording is generally carried out first into the groove portion 102 and then into the land portion 103. Now, the third embodiment will be described by way of example of a case in which an operation of recording into the groove portion is first carried out as described above.

If recording into the groove portion is first carried out, depending on the degree of its recorded state, the optical disk handled by the optical disk device according to the present invention can be roughly divided into a case in which the whole land portion is the unrecorded region M and recording is carried out into part of the groove portion as shown in FIG. 18 and a case in which recording into the whole groove portion is completed and the unrecorded region M exists in part of the land portion as shown in FIG. 19.

Such access process will be described in detail by using the flow charts of FIG. 16 and FIG. 17. In FIG. 16 and FIG. 17, when a recording or reproduction request first occurs (ST31), the unrecorded region M, the recorded region R, and the recordable region K of a respective one of the land portion and the groove portion on which an optical spot is currently formed are detected by the working of the recording information management portion 26 of FIG. 16 (ST32). Next, the unrecorded region M, the recorded region R, and the recordable region K of a respective one of the land portion and the groove portion on which an optical spot is not formed are detected (ST33). Then, if a layer for carrying out a recording process is assumed to be a layer on which an optical spot is currently formed (ST34), a determination is made as to whether the target is the groove portion or the land portion as shown in FIG. 17 (ST35).

If the target is the groove portion, only the groove portion makes access because the groove portion is divided into the recorded region R and the unrecorded region M and the entire land portion is expected to be the unrecorded region M. In other words, a determination is made as to whether or not the current target is the land portion (ST36). When the target is the land portion, the polarity is switched from a start position (point Z) of FIG. 18 to the groove portion at the inner periphery by the working of the polarity switch circuit 28 (ST37). Next, a first temporary target track (point Y) is set and an optical spot is moved (ST38). Then, an operation of accessing a final target track (point X) is carried out (ST39) so that the access is terminated (ST40).

In step ST36, if the current target is the groove portion, only the groove portion makes access without changing the polarity. After an optical spot has been moved to the first temporary target track (point Y) (ST41), tracking to the target track (point X) is carried out (ST42), whereby the access is terminated (ST43).

Further, a description will be given with respect to a case where it is determined that the target is the land portion in step ST35. When it is determined that the target is the land portion, it is expected that the entire groove portion is the recorded region R in which movement is easy, and that the land portion is the recorded region R and the unrecorded region M. Therefore, an access is made via the groove portion having the recorded region R in which an operation is stable.

If an optical spot (point V) exists at the current land portion (ST50), the polarity is immediately switched and the current optical spot is moved to an optical spot (point U) of the groove portion to which an access is easily made (ST51). Then, a third temporary target track (point Y) is set at the groove portion and the optical spot is moved (ST52). Further, the polarity is switched to the land portion at the inner periphery by the working of the recording information management portion 26 (ST53). The position of the optical spot after switched is set to be a second temporary target track (ST53). Thereafter, the optical spot is traced to a final target track (point W) (ST54), and the access is terminated when the optical spot reaches the final target track (ST55). In this manner, the optical spot reaches point W from point U via points V and Y.

Further, a description will be given with respect to a case in which a recording layer differs from the current layer and an interlayer jump is carried out in step ST34 in the flow chart of FIG. 16. If it is evident that recording is carried out in a layer different from the current layer in step ST34, the address of the current recording layer which corresponds to the boundary region of a recording region of a recording layer targeted for recording is detected from the recording information management portion 26 (ST60). In the recording information management portion 26, as is the case with the above first embodiment, a stable accessible address which does not pass through the unrecorded region M is determined from a distribution of the recorded region R and the unrecorded region M of each recording layer detected in step ST32 and step ST33. Then, an access is made to the above current address (ST61). Thereafter, an interlayer jump to a recording layer is carried out (ST62). Further, focus pull-in action is carried out (ST63), and track pull-in action is carried out (ST64). Subsequently, as shown in FIG. 17, the access process is carried out according to whether or not the target is the groove portion or whether the current position is in the groove portion or in the land portion.

As described above along the flow chart, also in the case where an optical disk for an optical disk device has a land portion and a groove portion, as is the case with the first embodiment and the second embodiment, an access is made while avoiding the unrecorded region M where a servo is unstable, thereby enabling a stable and speedy access process. Specifically, in the case where the groove portion has a track structure where the groove portion is processed to be recorded earlier than the land portion, an access is first made via the groove portion at which the stable recorded region R is distributed.

Here, the groove portion is a portion of a track structure which is protrusive with respect to light incidence, and the land portion is a portion of the track structure which is recessed. The above third embodiment is described by way of example when the groove portion is first recorded, but the present invention is applicable even in the case where the land portion is first recorded. In this case, the above access process enables an access process having the similar operation and advantageous effect by replacing the groove portion with the land portion, and vice versa.

Simple Access

Further, in the case where the unrecorded region M exists in the current layer and no unrecorded portion exists in an access target layer, even if the target address is in the land portion or the groove portion of a different layer, there can be used a method for first carrying out an interlayer jump from a current layer to an access target layer and then making an access by the access method described in the above flow chart.

Those skilled in the art can achieve the present invention according to a variety of embodiments described above. Further, a variety of modifications of these embodiments are easily invented by those skilled in the art. Even if those skilled in the art do not have inventive ability, the present invention is applicable to a variety of embodiments. Therefore, the present invention covers a broad scope which is not contradictory to the disclosed principle and novel characteristics, and is not limited to the above embodiments.

As described above in detail, according to the present invention, there can be provide an optical disk device and an access method for the optical disk device capable of a fast and stable access operation without passing through an unrecorded region M during an access operation.

What is claimed is:

1. An optical disk device comprising:
   an optical head which emits a laser light to an optical disk having a recording layer and receives a reflection light to carry out one of a recording process and reproduction process;
   a detecting unit which detects a distribution of a recorded region and an unrecorded region of the optical disk based on a reflection light received by the optical head;
   a control unit which controls the optical head so as to make access to a target position of a recording layer of the optical disk while avoiding the unrecorded region based on a distribution of a recorded region and an unrecorded region detected by the detecting unit; and
   wherein, in the case where the optical disk has a plurality of recording layers and the target position is in a second recording layer different from a first recording layer to which the optical head is currently positioned, and in the case where an access is made to the unrecorded region of the second recording layer when an interlayer jump is carried out at a currently accessed position, the control unit moves the optical head to a position of the first recording layer corresponding to a position at which the unrecorded region of the second recording layer does not exist, and then the optical head is jumped in an interlayer manner to be moved to the target position.

2. An optical disk device according to claim 1, wherein, in the case where the optical disk has a plurality of recording layers and the target position is in a second recording layer different from a first recording layer to which the optical head is currently positioned, and in the case where an access is made to the unrecorded region of the second recording layer when an interlayer jump is carried out at a currently accessed position, the control unit moves the optical head to a position of the first recording layer corresponding to a position at which the unrecorded region of the second recording layer does not exist, and the optical head is jumped in an interlayer manner and reaches a position at which the unrecorded region of the second recording layer does not exist, and further a second target position is set in front of the target position, and the optical head is moved thereto to be traced to the target position.

3. An access method for an optical disk device comprising:
   emitting a laser light to an optical disk having a recording layer and receiving a reflection light, thereby detecting a distribution of a recorded region and an unrecorded region of the optical disk based on a reflection light received by an optical head for carrying out one of a recording process and reproduction process;
   controlling the optical head so as to access a target position of a recording layer of the optical disk while avoiding the unrecorded region based on the detected distribution of a recorded region and an unrecorded region; and
   wherein, in the case where the optical disk has a plurality of recording layers and the target position is in a second recording layer different from a first recording layer to which the optical head is currently positioned, and in the case where an access is made to the unrecorded region of the second recording layer when an interlayer jump is carried out at a currently accessed position, control of the optical head moves the optical head to a position of the first recording layer corresponding to a position at which the unrecorded region of the second recording layer does not exist, carries out an interlayer jump of the optical head, and then moves it to the target position.

4. An access method for an optical disk device according to claim 3, wherein, in the case where the optical disk has a plurality of recording layers and the target position is in a second recording layer different from a first recording layer to which the optical head is currently positioned, and in the case where an access is made to the unrecorded region of the second recording layer when an interlayer jump is carried out at a currently accessed position, control of the optical head moves the optical head to a position of the first recording layer corresponding to a position at which the unrecorded region of the second recording layer does not exist, carries out an interlayer jump of the optical head, and reaches a position at which the unrecorded region of the second recording layer does not exist, and further the control of the optical head sets a second target position in front of the target position, moves the optical head thereto, and then traces it to the target position.

5. An access method for an optical disk device comprising:
   emitting a laser light to an optical disk having a recording layer and receiving a reflection light, thereby detecting a distribution of a recorded region and an unrecorded region of the optical disk based on a reflection light received by an optical head for carrying out one of a recording process and reproduction process;
   controlling the optical head so as to access a target position of a recording layer of the optical disk while avoiding the unrecorded region based on the detected distribution of a recorded region and an unrecorded region; and
   wherein, when the optical disk has a plurality of recording layers to be stacked and it is detected that the unrecorded region exists in a first recording layer to which the optical head is currently positioned and that the target position exists in a second recording layer different from the first recording layer, control of the optical head makes access to the target position after an interlayer jump to the second recording layer is carried out without moving the optical head in the first recording layer.

* * * * *